United States Patent [19]
Jackson

[11] 3,917,770
[45] Nov. 4, 1975

[54] METHOD OF THERMOFORMING THERMOPLASTIC FOAM MATERIAL

[75] Inventor: William B. Jackson, Canandaigua, N.Y.

[73] Assignee: Mobil Oil Corporation, New York, N.Y.

[22] Filed: Nov. 7, 1973

[21] Appl. No.: 413,748

[52] U.S. Cl. .................. 264/28; 229/2.5; 264/296; 264/321; 264/322; 264/348; 264/DIG. 66
[51] Int. Cl. ........ B29d 7/22; B29d 7/24; B29d 7/00
[58] Field of Search .... 264/321, 221, 294, DIG. 66, 264/322, 28, 348, 296; 229/2.5, 44, 45

[56] References Cited
UNITED STATES PATENTS

| | | | |
|---|---|---|---|
| 2,251,477 | 8/1941 | Wisman | 264/DIG. 66 |
| 2,468,697 | 4/1949 | Wiley | 264/DIG. 66 |
| 3,184,524 | 5/1965 | Whiteford | 264/294 X |
| 3,338,997 | 8/1967 | Tigner | 264/296 X |
| 3,367,554 | 2/1968 | Lurie | 229/2.5 |
| 3,420,930 | 1/1969 | Lurie | 264/294 X |
| 3,450,326 | 6/1969 | Foote | 264/321 UX |
| 3,534,128 | 10/1970 | Makowski | 264/28 |
| 3,626,053 | 12/1971 | Hofer | 264/294 X |
| 3,640,668 | 2/1972 | Brown et al. | 264/321 X |
| 3,651,202 | 3/1972 | Raabe | 264/322 X |
| 3,687,350 | 8/1972 | Warburton | 229/2.5 |

FOREIGN PATENTS OR APPLICATIONS

| | | | |
|---|---|---|---|
| 1,184,487 | 3/1970 | United Kingdom | 264/296 |
| 2,026,427 | 12/1971 | Germany | 264/296 |
| 1,028,975 | 5/1966 | United Kingdom | 264/92 |

OTHER PUBLICATIONS

Royer, Roger G. and William R. Meadors "Deep Drawing of Abs. Plastic Sheet" in Spe Journal, August 1968, Vol. 24, pp. 37–41.

*Primary Examiner*—Philip E. Anderson
*Attorney, Agent, or Firm*—Charles A. Huggett; Carl D. Farnsworth

[57] ABSTRACT

A two-stage thermoforming operation is described which relies upon temperature variations and mold configurations to lock in a desired shaped article of polymeric material having a reduced tendency to distort upon removal from a thermforming operation. The mold configurations and sequence used permit deep draw forming without fracture of the polymeric material.

8 Claims, 4 Drawing Figures

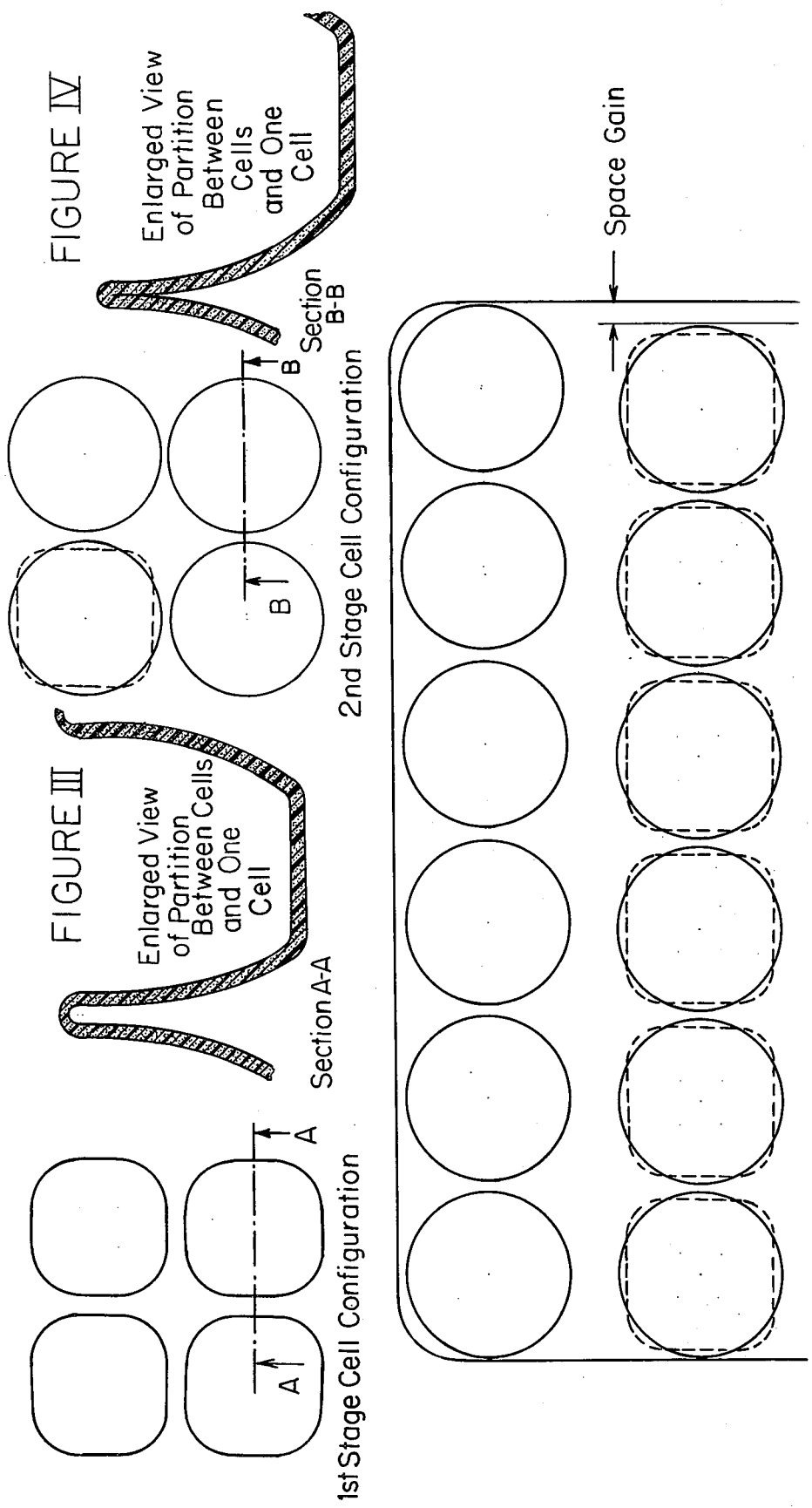

METHOD OF THERMOFORMING THERMOPLASTIC FOAM MATERIAL

BACKGROUND OF THE INVENTION

This invention relates in general to the molding of thermoplastic and/or thermosetting polymeric materials. In a more particular aspect the invention is concerned with the field of heat molding or thermoforming of thermoplastic materials and particularly polystyrene foam sheet material. The art of shaping or molding materials in the presence of heat and/or cold has been practiced in the prior art and is of considerable commercial importance in today's environment. In the prior art thermoplastic articles such as cups, plates, heat insulating containers, meat trays, egg cartons and many other items have been formed by one of a variety of molding techniques which include injection molding, centrifugal molding, thermoforming and the like. The method of shaping articles in the presence of heat is generally known as thermoforming and comprises in a specific embodiment of preheating a sheet of foamed thermoplastic material and bringing the preheated sheet in contact with the surface of a molding element and forcing the preheated thermoplastic sheet to assume the configuration of the mold by impressing a second matching molded element thereon which forces and presses the preheated thermoplastic material to generally conform to the space intermediate the machine mold elements. In this environment utilizing prior art thermoforming techniques to form shaped plastic articles such as egg cartons or other less complicated configurations, following the removal of the shaped article from the forming mold there is a tendency of the article to deform due to residual heat contained in the formed article causing forces of stress orientation to deform the still warm article. This problem is aggravated by polystyrene foam material since this material during extrusion and sheet forming operating conditions tends to be stress oriented. Thus when such stress oriented materials are subjected to reheating as during a molding operation providing residual heat, they have a tendency to distort at elevated temperatures from a desired mold configuration thereby producing an undesired distortion or warpage in the final product. This distortion often takes form of increase in the part thickness. Thus it can cause problems in stacking height, denesting, and loss of internal volume (e.g., egg room). Such distortion has been particularly identified with thermoformed plastic articles produced from polystyrene foam. For example, in the case of egg cartons which have interlocking elements formed by the molds, the interlocking elements do not function properly after recovery of the carton from the mold due to warpage and distortion encountered in the article. Thus the locking elements in such cartons are not in proper alignment and the object thus must be discarded as an unsatisfactory molded article. The present invention is concerned with improving the thermoforming molding technique of polystyrene foam material and is particularly concerned with producing an improved egg carton from polystyrene foam.

SUMMARY OF THE INVENTION

An object of the present invention is to form polystyrene foam sheet material into egg cartons which retain the shape of the mold after removal therefrom. A further object of the present invention is to form egg cartons which cluster the egg retaining cells more compactly within a given space without sacrificing cell strength and cell size. Yet another object of the present invention is concerned with providing a larger egg cell receptacle within the given dimensions and surface area of a standard size egg carton. Other objects and advantages of the present invention will become more apparent from the following discussion.

The present invention is concerned with the preparation of foamed polystyrene egg cartons having the characteristics of egg cartons described and claimed in U.S. Pat. No. 3,648,916 issued Mar. 14, 1972; U.S. Pat. No. 3,687,350 issued Aug. 29, 1972 and U.S. Pat. No. 3,735,917 issued May 29, 1973. The subject matter and disclosure of the above identified patents is to be incorporated herein by reference thereto in the present disclosure.

In one aspect, the present invention is directed to forming shaped articles of polystyrene foam in stages. For example, multi-stage thermoforming offers many advantages over the more conventional single stage thermoforming operations. Some of these advantages are related to more selective operating temperatures and therefore higher production line speeds may be employed, more optimum mold temperatures may be utilized without impairing the production line speed; parts may be reshaped, shaped in stages and then frozen in shape in a final molding stage allowing the thermoforming of shapes not heretofore possible in a single stage thermoforming operation.

One area in which a multi-stage thermoforming operation may be used to real and great advantage is in the manufacture of egg cartons as herein described. For example, the outside dimensions of an egg carton are fixed by the requirements of the automatic packing equipment and shipping containers used in the industry. Therefore providing more egg room or improving the egg carton structure requires the use of innovating techniques not heretofore possible or practiced in the prior art thermoforming operations.

One method of obtaining more room in the carton egg cell with a two-stage thermoforming operation centers around the concept of reducing the space occupied by the partitions between egg cells and this can be accomplished by the technique of the present invention of forming generally square cells in a first thermoforming stage and converting the square cells to round cells in a second stage of the thermoforming operation. Furthermore, the round cell shape may then be frozen in shape in the second stage by using low temperature forming of limited deformation or stretching to the material being shaped. On the other hand, the first stage thermoforming step may be effected at a higher temperature than desirable heretofore but more suitable for deep draw forming of the thermoplastic material. Thus the combination of deep and shallow draw forming of this invention under temperature conditions more suitable for each step substantially eliminates tearing, breaking and undesired deformation of the thermoplastic material. It also permits the forming of a shape not heretofore possible via a one stage forming process.

The multistage thermoforming operation of the present invention specifically directed to the shaping of polystyrene foam sheet into egg cartons relies upon a foam sheet preheat step wherein the sheet is heated to an elevated temperature in the range of about 210° to about 250°F. The heated sheet is then incrementally progressed such as the distance of a carton length to a first relatively high temperature deep draw thermoforming step wherein the preheated sheet is formed between matching male and female molds at a lower temperature. The molds are maintained at a temperature below the web or polystyrene sheet temperature thereby causing the surface of the heated foam sheet to be cooled. The molded sheet is thus partially cooled in the first stage and thereafter the molded material is separated from the first stage mold and incrementally advanced to a second stage of molding wherein reshaping of the egg cell is performed in accordance with this invention at a temperature which is as low as possible and within the range of about 0° to about 50°F. In this second stage of reforming or reshaping the egg cell, the temperature is preferably below 50°F. and the extent of reshaping of the egg cell is limited. Some limited drawing of the foamed material may be practiced. Cooling of the reshaped cells and adjacent structure is simultaneously accomplished in this second stage operation. This cooling and reshaping step, substantially locks in the desired egg carton shape and subsequent deformation of the molded polystyrene by retained heat or stress orientations in the molded material is virtually eliminated.

The deep and shallow draw operations of the two-stage thermoforming operation of the present invention is accomplished in a most unique fashion. A feature of the design geometry for this first and second stage operation is concerned with tooling the molds used therein so that the reshaping step in the second stage of the operation under relatively cool conditions does not include significant drawing or stretching of the polystyrene material. To accomplish this, the mold employed in the first stage uses a generally square shaped conical plug with rounded corners for the initial egg cell shape and the mold in the second stage uses a round egg shaped conical plug to reshape the generally square cell formed in the first stage. Thus to void significant drawing or stretching of the material in the cooler second stage operation the cell shape is changed from a generally square shape with round corners to a round plug egg shape. In this combination of plug shapes the perimeter length of the square plug is approximately the same as the circular perimeter of the final round egg shape plug. The final carton internal cell geometry is a cross between the rectangular and round plugs. This is important for we want the egg to rest on four points within the cell. This is to permit easier deflection of the cell during impact than if 360° of contact (i.e., a round cell) were the case. The easier deflection improves the egg protection characteristics of the carton.

In the two-stage forming operation above discussed, the generally square plugs of the first mold are oriented to align the minimum diameter of the plug with the length of the egg carton so that upon reshaping of the cell in the second stage forming operation the space between cells and adjacent polystyrene will be reduced by compression and thus collapsed in the second stage forming operation relying upon the round plug molds for this purpose as more completely discussed in greater detail below. The compression is such that the underside of the partitions actually come into direct foam to foam contact (clearly not possible in single stage-forming).

It is clear from the above discussion that the combination operation of this invention permits operating the first stage deep draw forming operation at a higher temperature than would be possible in a single stage forming operation so that the material may be deep drawn by more suitable molds for this purpose without fracturing and tearing the formed polystyrene. The second stage forming or reshaping can, on the other hand, be accomplished at substantially shape lock in temperature conditions without fracturing the material because the second stage operation is a limited reshaping operation. It is known that polystyrene foam is spongy and tends to spring back or expand at upper temperature conditions but will tear and fracture at low temperature conditions when drawn or shaped beyond relatively strict limits. Thus to use mold lock in temperatures below about 40° or about 50°F. without fracturing the foamed material, the extent of stretching or deformation must be considerably limited.

BRIEF DESCRIPTION OF THE DRAWINGS

FIG. I diagrammatically represents one arrangement of apparatus for thermoforming polystyrene foam sheet material in a multi-stage operation comprising separate sequentially arranged deep and shallow draw operations of decreasing temperature in the direction of sheet movement.

FIG. II is a schematic drawing comprising a prior art egg cell spacing arrangement adjacently compared with that obtained by the two-stage operation of the present invention and the space gain advantage using the combination operation of this invention.

Figure 1:
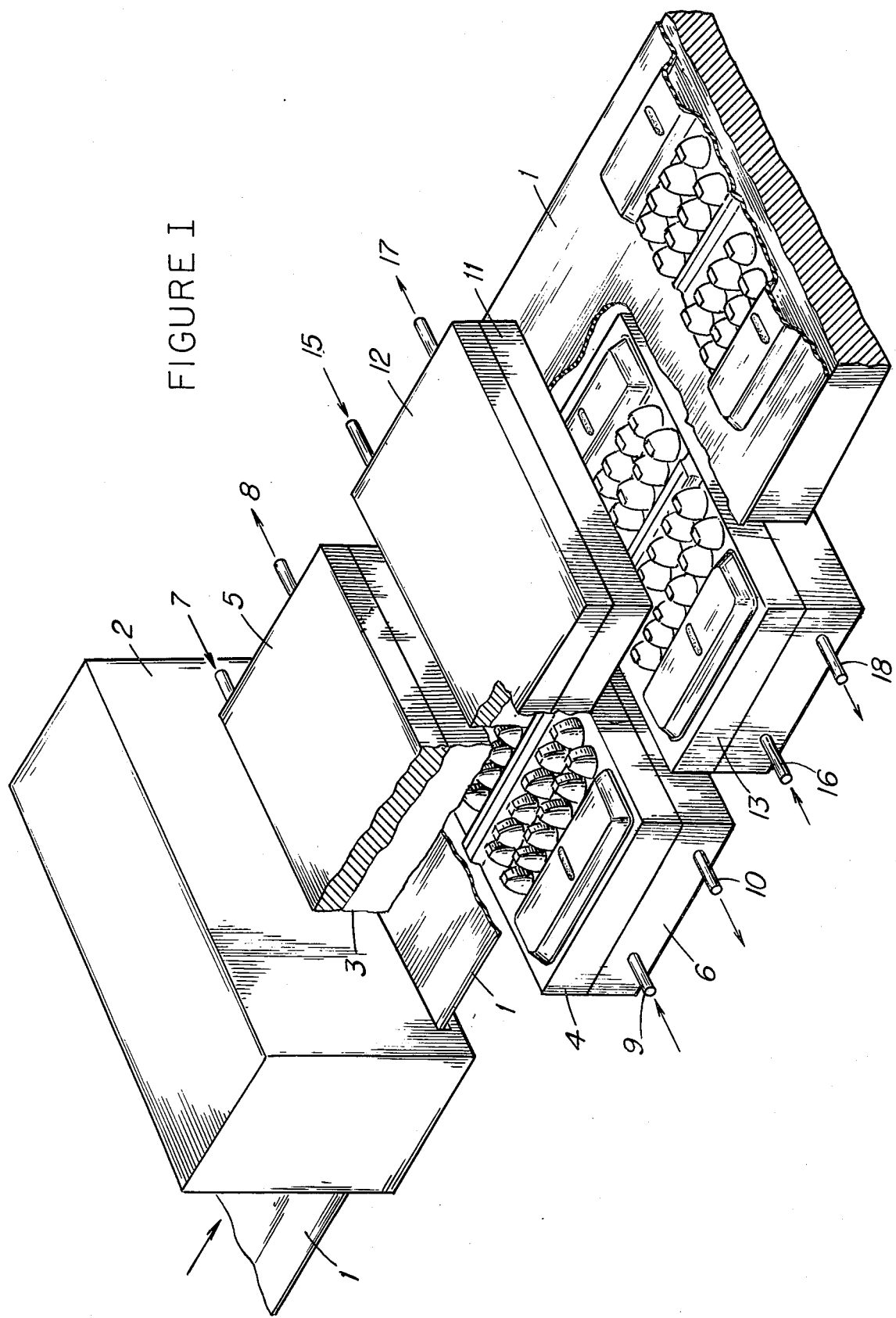

FIG. III is a diagrammatic sketch representing the square cell shape obtained from the first stage mold and a cross-sectional view A—A between cells and of one cell of the portion of polystyrene formed by the deep draw molding step.

FIG. IV is a diagrammatic sketch representing the round cell shape of the second stage reshaping operation and a cross-sectional view B—B of one cell and of the collapsed polystyrene partition between cells.

DISCUSSION OF SPECIFIC EMBODIMENTS

Applicants have now substantially reduced or eliminated the prior art difficulties associated with molding polymeric foam material and particularly those involving deep draw forming operations by a two-stage molding operation of the present invention. The concepts and essence of the present invention are equally applicable to other forming operations which encounter the same or similar problems associated with the deep and/or shallow draw of polystyrene foam wherein deformation of a desired molded shape occurs particularly as a function of retained heat and improperly relieved stresses in the material molded.

Briefly, the present invention relates to the molding of polymeric material in stages in which a first stage of molding forms an article closely representing a final form of the desired molded article and the second stage completes the molding operation at temperatures which substantially locks in the desired shape to the molded article during a limited reshaping or second stage molding operation. In the two-stage molding operation herein defined, the dwell time of the polystyrene in each stage of the mold may be in the range of 1 to 4 seconds and usually is not more than about 2 seconds.

Referring now to FIG. I by way of example, there is shown, diagrammatically a multi-stage operation for heating polystyrene foam sheet and molding the heated sheet in a sequentially arranged two-stage molding operation. In this combination polystyrene foam sheet 1 of about 90 mil thickness is caused to pass through a preheat zone 2 wherein the sheet is heated to an elevated temperature of about 230°F. in this specific example. The polystyrene sheet is incrementally advanced by suitable mechanical means not shown in an amount corresponding to that required in the first stage molding operation. Thus the incremental advance will be at least equal to the mold dimension. During the preheat step the foamed sheet expands as mentioned above to approximately double its inlet thickness or to about 180 mils while it is being heated to its elevated molding temperature.

In the arrangement of FIG. I, a female mold element 3 is positioned adjacent the preheat zone and above the advanced preheated foam sheet. A male mold element 4 is positioned below the sheet and vertically aligned for matching engagement with the female mold 3 thereabove. A cooling chamber or zone 5 is affixed to the top surface of mold 3. A cooling chamber or zone 6 is affixed to the bottom surface of mold 4 as shown. Liquid coolant inlet conduit 7 and outlet conduit 8 are provided for chamber 5. Liquid coolant inlet conduit 9 and outlet conduit 10 are provided for chamber 6.

The forward motion of the polystyrene sheet 1 is interrupted during matching engagement of molds 3 and 4 during which interruption, deep drawing of the sheet is accomplished at a fairly high temperature selected from within the range of 45° to 210°F. In a specific operation the temperature of mold 3 is maintained at a temperature of about 160°F. and mold 4 is maintained at a temperature of about 75°F. for deep drawing the sheet heated to a temperature of about 230°F. After retracting or separating molds 3 and 4, the sheet is advanced a sufficient amount to bring a first stage molded article in alignment with a second stage molding operation as herein provided. The second stage molds may preferably be immediately adjacent the first stage molds or separated a part therefrom equivalent to predetermined index lengths of the web. In any event the second stage molding step comprising female mold 11 with its upper attached cooling chamber or zone 12 is in vertical alignment with a lower male mold 13 with its attached cooling chamber 14. Conduits 15 and 16 are for introducing cooling fluid to the cooling chambers and conduits 17 and 18 are for removing the cooling fluid. During operation, the second stage molds 11 and 13 are brought in matching engagement with the partially molded material separated from the first molding step under even lower temperature condition for the purpose of fixing the molded article shape during the final reshaping of the molded article as obtained from the first molding stage. As discussed above, the second molding step is normally less than a very shallow draw operation and is preferably referred to as merely a reshaping operation involving limited stretching or reshaping and compression of the foamed sheet material so that fracture or tearing of the molded article will be avoided during this second stage forming or reshaping operation. In a specific embodiment, the first stage molding or deep draw operation relies upon the use of the generally square shaped conical plugs to form the egg retaining cells and the thus formed square shaped cell is then rounded in the second stage low temperature molding step and the polystyrene foam partitions between cells are compressed during this cell rounding step. This compression is accomplished not by matched male/female tooling but rather by the wedging action of the partitions formed in the first stage into the narrow gap between the round male plugs of the second stage mold. This wedging action is not assisted by a female mold partition rising between the male mold plugs. This design innovation thus permits the foam partition to be formed significantly narrower than would be possible in one stage alone, thus increasing the carton's egg carrying capacity.

As suggested earlier, the cover portion of the carton may be further compressed in the second molding stage or merely temperature fixed in shape during this operation. The cooling fluid used may be water or any other fluid suitable for the purpose. The molded articles comprising egg cartons of molded polystyrene foam sheet are separated from the molds of the second stage operation and the sheet with attached molded article is advanced to cutting equipment not shown for separating the molded article from the sheet.

The FIG. I arrangement and method of operation may be varied in several respects. For example, a cooling step may be used intermediate the first and second stage molding or thermoforming operations. On the other hand, the male and female molds of each stage may be segmented for individual and separate temperature control of each segment. In this embodiment it is contemplated providing a mold segment for the carton cover which is individually temperature controlled within the range of about 70° to about 90°F; a mold segment for the egg cell section of the carton individually temperature controlled within the range of about 140° to about 190°F. in the first stage molding step but at a much lower temperature in the second stage molding step and a mold segment for the carton flap individual temperature controlled within the range of about 40° to about 60°F. It is also contemplated temperature controlling the matching male and female segments to be at the same or different mold temperatures. For example, the female portion of the cell section may be maintained at a higher temperature than the matching male mold section or the opposite temperature relationship may be employed. Thus the portion of the mold subjecting the foam sheet to deep draw molding operations may be maintained at a higher temperature than that portion of the mold providing only shallow draw molding of the foam sheet.

It is clear from the above that the present invention is concerned with selecting operating parameters in a multi-stage thermoforming operation which will preclude fracture, tearing and undesired disorientation of the shaped polystyrene foam sheet or the formation of sections of insufficient body to provide desired rigidity. It also maximizes the amount of cooling of the formed part consistent with and no mold fracture.

The essence and concepts of the present invention are more completely understood by reference to FIGS. II through IV. FIG. II is a schematic showing of egg cells formed by a single stage forming operation and a multi-stage forming operation embodying the concepts of the present invention. For example, in the arrangement of FIG. II the top row of cells for retaining eggs in a carton and formed by a single stage operation are necessarily spaced relatively far apart from one another by virtue of the molds used and required to provide the deep drawn separating foam material between cells. Section A—A of FIG. III generally represents the separating cross-section between cells of the upper row of cells of FIG. II. The lower row of cells of FIG. II represents the final relationship between cells when practicing the two stage cell forming concepts of the present invention. That is, it will be observed that the cells are more closely compacted within a given area without loss in cell space thereby providing a considerable gain in usable space as indicated in the figure. This space gain may be utilized to provide protecting material or a ridge across the end of the carton or it may be used to provide larger cells within the overall available space or a combination of both may be utilized.

In FIG. II, the lower row of schematically arranged cells also shows the relationship between the square shaped cell form used by applicant in the first stage forming operation and the round cell shape used to reform or reshape in the second stage forming operation. The second stage reshaping operation involves very little, if any, stretching of the cell shape obtained from the first molding stage and low mold temperatures are desirably and thus successfully used. Furthermore, the limited compression of the shaped material between cells in the second stage substantially avoids any fracturing of the foamed polystyrene. This is diagrammatically shown and illustrated by FIG. IV cross-section B—B. Thus, in the final reshaping stage, the molded article shape is substantially locked in at the low temperature employed and the cell is not weakened or fractured by significant stretching and drawing of the polystyrene foam sheet material. The reshaping second stage operation is thus preferably restricted to avoid fracturing, tearing or undesired significant deformation of oriented polystyrene material shaped in the operation.

In the combination thermoforming operation of this invention, the formed egg cell will be generally round in its upper perimeter but due to the characteristics of the formed sheet to retain an original shape it will also tend to retain some of its rectangular shape particularly in the bottom or lower portion of the cell. This combination cell shape is highly desirable since it will accommodate different sized eggs. For example, small eggs will settle lower in the cell, medium size egg will be supported essentially by four point contact within the cell and larger eggs will tend to deflect the cell to peripheral contact. Also the more rounded upper portion of the cell will help to accommodate the larger size egg.

FIGS. III and IV diagrammatically represent the formation and general change in cell shape except as above described occurring in applicant's first and second stage thermoforming operation for converting sheet polystyrene foam material into egg cartons. The cover and flap portions of the carton are much less subjected to stretching forces and thus do not encounter severe stresses encountered with deep draw operations for cell formation. Accordingly, applicant's specific contribution is particularly directed to deep draw thermoforming operation and problems related thereto in thermoforming materials such as polystyrene foam sheet to form the cell of an egg carton. FIGS. III and IV also show diagrammatically the space relationship of the deep drawn polystyrene material between cells produced in the first and second stage forming operations. By employing the combination operation of the present invention substantially improved egg carton configurations are produced as above described without loss in strength or egg protection. In fact, eggs positioned in the end cells of the carton will receive a much greater protection than heretofore has been possible.

It will be readily apparent to those skilled in the art that the combination operation of the present invention and the concepts expressed in connection therewith may be expanded to numerous other thermoforming operations with particular advantage.

Having thus provided a general discussion of the improved concepts and methods of using these concepts and discussed specific embodiments in support thereof, it is to be understood that no undue restrictions are to be imposed by reason thereof except as defined by the following claims.

I claim:

1. A method for shaping polystyrene foam which comprises:

heating a sheet of polystyrene foam to a temperature sufficient for deep draw forming of said polystyrene foam, deep draw forming at an elevated temperature said heated polystyrene foam to form a preform substantially the shape of a product article desired, and reshaping the deep drawn polystyrene foam preform without rupture between reshaping molds maintained at a temperature below 50°F to form the article desired.

2. A method for thermoforming polystyrene foam sheet material into egg cartons which comprises:

preheating the polystyrene foam sheet to a temperature suitable for deep draw thermoforming thereof, impressing said preheated polystyrene sheet at an elevated thermoforming temperature between molds providing generally egg shaped rectangular cells in a cellular section, said rectangular cells aligned with one another on their minimum width axis, impressing the thus formed egg shaped rectangular cells comprising said cellular section between a second stage of molds designed to reshape, in a second stage reshaping operation, the rectangular cells in at least an upper portion thereof to circular cells of substantially the same perimeter dimension, and effecting said second stage reshaping operation at a temperature below 50°F to substantially lock in the reshaped cell configuration of the egg carton.

3. A method of forming egg cartons from polystyrene foam sheet which comprises, heating the foam sheet to a thermoforming temperature, impressing the heated foam sheet at an elevated thermoforming temperature in a first stage between molds designed to provide an egg carton cover section, an egg retaining cellular section and a flap section, said cellular section comprising egg retaining cells generally rectangular in shape, removing the egg carton from the elevated temperature thermoforming operation and impressing it between molds maintained at a much lower temperature below 50°F, said molds designed to reshape the generally rectangular egg retaining cell to a more round cell in at least the upper portion thereof and said lower temperature mold operation being sufficient to substantially lock in the configuration of the egg carton with its more round reshaped cell.

4. The method of claim 3 wherein the rectangular shaped cells are aligned with one another on their minimum widths and the reshaping thereof to a more round configuration compresses particularly an apex of the polystyrene foam material formed between next adjacent rectangular cells.

5. The method of claim 3 wherein the molds used are individually cooled in one or more sections thereof and the temperature of the reshaping operation is within the range of 0° to about 50°F.

6. The method of claim 3 wherein the lower portion of the cell in the cellular section retains its generally rectangular shape in the lower portion thereof during the low temperature reshaping operation and reshaping of the cell to a more round shape is restricted to substantially the upper portion of the cell.

7. The method of claim 3 wherein the cells of the cellular section are more closely spaced together with respect to one another than obtainable in a single stage thermoforming operation.

8. The method of claim 3 wherein the temperature of the first stage of thermoforming is effected at a temperature above about 50°F. and reshaping of the thermoformed article of the first stage is accomplished at a temperature below about 50°F.

* * * * *